March 10, 1931.    D. W. MATHISON    1,795,498
ELECTROMAGNETIC DEVICE
Filed June 20, 1928
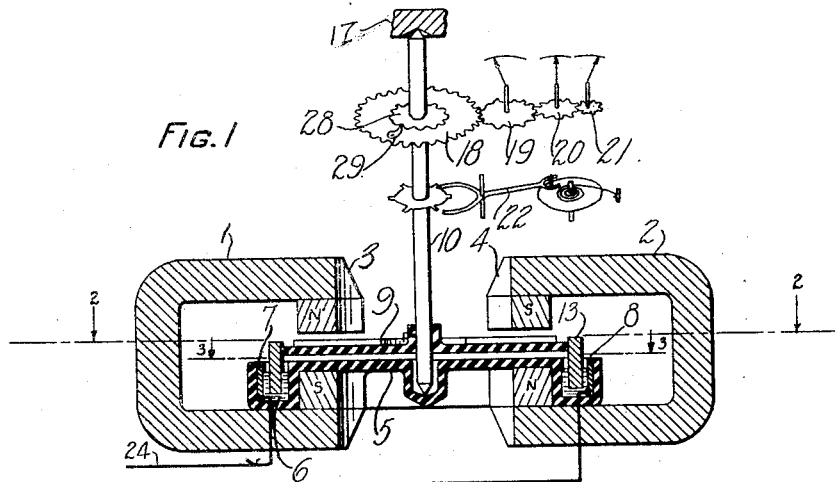
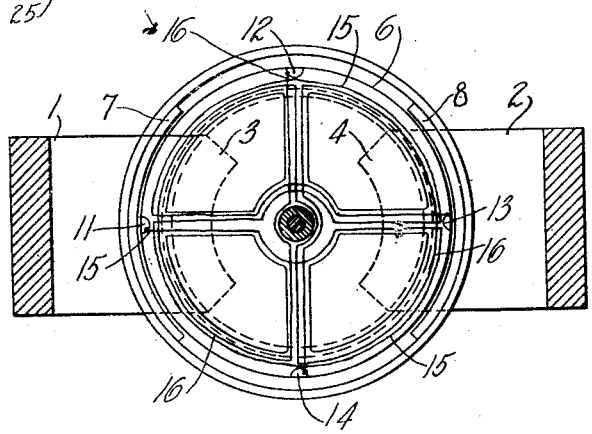
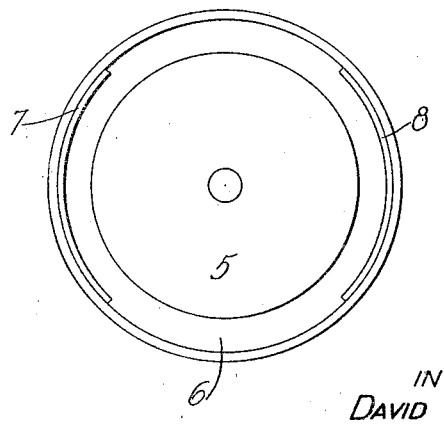
INVENTOR
DAVID W. MATHISON
BY
ATTORNEY Patented Mar. 10, 1931

1,795,498

UNITED STATES PATENT OFFICE

DAVID W. MATHISON, OF TUCKAHOE, NEW YORK, ASSIGNOR TO BELL TELEPHONE LABORATORIES, INCORPORATED, OF NEW YORK, N. Y., A CORPORATION OF NEW YORK

ELECTROMAGNETIC DEVICE

Application filed June 20, 1928. Serial No. 286,851.

This invention relates to electromagnetic devices and particularly to metering devices for measuring the duration of conversation on telephone lines.

The objects are to increase the sensitivity and to simplify the construction of these devices.

Heretofore, it has been proposed to measure the service on a subscriber's line by providing, at the substation, a meter having a disk immersed in mercury and arranged to rotate continuously during conversation. The force for rotating the disc is caused by the flow of current through the disc, which is in proximity to the pole-pieces of a permanent magnet. It has also been proposed to increase the sensitivity of the meter by shaping the poles of the magnet and by directing the current through the disc in such a manner that all of the available current is effective in producing torque.

According to the present invention, an advantage over these devices is secured and the sensitivity still further increased by providing a meter in which the operating current is directed across the rotating disc by means of conducting wires so arranged as to cause the current to flow across the disc several times. This increases the impedance, and hence the energy available, with a given value of current flowing through the field of the permanent magnet, is greatly increased with a corresponding increase of torque. Moreover, no special construction of the permanent magnet pole-pieces is necessary.

A feature of the invention is a meter of the type described in which an escapement mechanism is geared to the rotatable disc to keep its speed constant regardless of fluctuations in the operating current. This insures that the metering mechanism is driven at a constant rate and, therefore, accurately measures the length of time consumed in conversation on the line.

In the drawing, Fig. 1 is a sectional view taken vertically through the device and illustrating the internal construction. Fig. 2 is a horizontal section taken along the line 2—2 in Fig. 1. Fig. 3 is a top view of a detail.

The device described herein is particularly suitable for use at the substations of telephone lines for measuring the length of conversation. In principle, it comprises a movable element which rotates continuously in response to the flow of current in the telephone line during the conversational period. Since the intensity of the current in a subscriber's line is of a low order, the problem of designing an instrument, which will produce sufficient mechanical energy to operate a registering train, is a difficult one. To meet this difficulty the device herein described is so constructed that practically the entire amount of current available in the subscriber's line is conducted across the face of the rotatable element or disc in such a way that it passes a plurality of times through the magnetic field of the stationary permanent magnets located in close proximity to the rotating disc. By conducting the current through the field a number of times the amount of turning effort for driving the disc is correspondingly increased.

Referring to the drawing, the measuring device comprises two U-shaped permanent magnets 1 and 2 which are conveniently mounted upon a stationary base in opposing relation to each other. The magnet 1 is provided with pole pieces 3 which are circular in shape as seen in Fig. 2. Likewise the pole pieces 4 of the magnet 2 are circular in shape.

Supported by the magnets 1 and 2 and extending between their pole faces is a circular member 5 constructed of insulating material. The member 5, which is shown in detail in Fig. 3, is formed at its outer periphery to provide an annular channel 6. The channel 6 is filled with some conducting fluid, such as mercury, serving to conduct current to and from the disc. Secured along the outer surface of the channel 6 are two arcuate metallic terminals 7 and 8. The terminal 7 is of sufficient extent to span the magnet 1 while the terminal 8, arranged on the opposite side of the device, is of sufficient length to span the magnet 2. This relation is clearly seen in Fig. 2.

A rotatable disc 9, constructed of insulating material, is secured to the spindle 10 which is pivoted at its lower end in the stationary member 5 and at its upper end in the frame 17. The disc 9 is provided in its upper surface with two channels extending diametrically across the face of the disc and perpendicular to each other as seen in Fig. 2. Attached to the periphery of the disc 9 are four terminals 11, 12, 13 and 14 of some suitable conducting metal. These terminals are attached to the disc at the ends of the perpendicular channels above mentioned. The terminals 11 to 14 inclusive extend downwardly and into the mercury in the channel 6, so that as the disc rotates the terminals move around channel 6 in continuous electrical contact with the mercury therein.

The winding or conducting path by which current is caused to flow from one edge of the disc to the other through the field of the stationary permanent magnets 1 and 2 comprises two separate conductors. One of these conductors 15 is secured to the terminal 11 and lies in the channel extending across the face of the disc to a point near the terminal 13 where it turns and follows the periphery of the disc around to a point near the terminal 11 where it then reenters the channel and extends again across the face of the disc to a point near the terminal 13 where it then turns in the opposite direction and follows the periphery of the disc around to the terminal 11 again, then extending across the face of the disc and is finally secured to the terminal 13. In this manner the conductor 15 is so arranged that current entering the terminal 11 will flow three times across the face of the disc before it finally leaves at the terminal 13. By inspecting the drawing it will be seen that the other conductor 16, which starts with terminal 16 and terminates with the diametrically opposite terminal 14, is so arranged as to extend diametrically across the disc 9, three successive times, obviously the wires 15 and 16 may be arranged to cross the disc any desired number of times.

Inasmuch as the current flowing in a telephone line is subject to variations depending on the resistance of the line it is desirable to provide some means for preventing a variation of current from changing the speed at which the meter operates. The number of rotations made by the disc of the meter in a given time should be substantially constant for similar periods of time in order to give an accurate measurement of the time during which the circuit is in use. To secure this result an escapement mechanism 22 is attached to the spindle 10 and serves to regulate and maintain the speed of the spindle at a uniform value.

The spindle 10, by means of sprocket wheels 18, 19, 20 and 21, drives a suitable metering train by which the total time that the circuit is in use is definitely registered. The ratchet 28 and pawl 29 prevent the disc from rotating in the opposite direction in case the direction of current is reversed.

The operation of the device will now be described. Assume, for example, that it is connected at the substation in series with a subscriber's telephone line 24—25. Current flowing over the conductor 24 to the metallic terminal 7 passes into the mercury. Since the mercury is of substantially higher resistance than the metallic conductors, current will flow directly from the terminal 7 to the conducting terminal 11 for instance, provided the terminal 11 is the one nearest to the terminal 7 at this particular time. From the terminal 11 it will flow over the conductor 15, as traced, across the face of the disc and through the field of the magnets 1 and 2 to the terminal 13 and thence through the mercury in the channel to the terminal 8 and returning over the conductor 25. As the disc rotates to a point where the terminals 11 and 13 are at a greater distance from the stationary terminals 7 and 8 than are the other terminals 12 and 14, current will now flow through the terminals 12 and 14 and the connecting conductor 16. As seen in Fig. 1, the portions of conductors 15 and 16 which extend along the periphery of disc 9 are substantially outside the field of magnets 1 and 2 and in any event would not produce torque in a direction to cause rotation of the disc. Therefore, only the current flowing diametrically across the disc reacts with the field.

The windings are so arranged with respect to the polarity of the magnets and the direction of current flow that the effect produced by the current flowing through the fields of the magnets causes the spindle 10 to rotate always in the same direction thus making a cumulative registration of the conversational periods.

While the meter has been particularly described for use in telephone systems it will be understood that it is not so limited, but may be used for measuring the time of current flow in other kinds of systems.

What is claimed is:

1. The combination in a meter of a magnet having pole pieces, a rotatable disc supported in proximity to said pole pieces, a conductor secured to the disc and passing across the face thereof, means for directing a flow of current through said conductor only while it is within the field of said pole pieces, and means operated by said disc.

2. The combination in a metering device of a permanent magnet having pole pieces, a rotatable disc supported in proximity to said pole pieces, a conductor arranged diametrically across said disc, means for causing a flow of current through said conductor only while it is within the field of said pole pieces and registering means operated by said disc.

3. The combination in a meter of a magnet having pole pieces, a rotatable disc supported adjacent to said pole pieces, a conductor secured to the disc and arranged to pass radially across the disc a plurality of times, means for directing current through the conductor only while it is within the field of said pole pieces, and means actuated by the rotation of said disc.

4. The combination in a meter of a magnet having pole pieces, a rotatable disc supported in proximity to said pole pieces, a container having mercury therein, terminals attached to the disc and immersed in said mercury, a conductor connected to said terminals and passing radially across the disc a plurality of times, and means including the mercury for directing current through said conductor each time the disc brings said conductor into the field of the magnet.

5. The combination in a meter of a magnet having pole pieces, a rotatable disc mounted in proximity to said pole pieces, means for directing a flow of current across said disc, and a device coacting with the disc to maintain its speed of rotation constant.

6. The combination in a meter of a permanent magnet having pole pieces, a rotatable disc supported in proximity to said pole pieces, means for directing a flow of current across the disc to cause the rotation thereof, and an escapement mechanism coacting with the disc to maintain its speed constant.

7. In a meter, a magnet having pole pieces, a spindle, a disc secured to said spindle for rotation, means for conducting current across the disc in the field of said pole pieces to cause rotation of said disc, and an escapement mechanism coacting with said spindle to maintain the speed of rotation uniform.

8. The combination in a measuring device of a magnet having pole pieces, a rotatable disc supported adjacent to said pole pieces, said pole pieces being so shaped as to cover only a portion of said disc, a conductor secured to the disc and arranged to pass across the disc a plurality of times, means for directing current to said conductor, means for limiting the flow of current through said conductor to such time as it is within the field of said pole pieces, and means actuated by the rotation of the disc.

In witness whereof, I hereunto subscribe my name this 11th day of June, 1928.

DAVID W. MATHISON.